United States Patent
Sasaki

(10) Patent No.: US 12,056,463 B2
(45) Date of Patent: Aug. 6, 2024

(54) OPTIMIZATION APPARATUS AND METHOD OF CONTROLLING OPTIMIZATION APPARATUS

(71) Applicant: FUJITSU LIMITED, Kawasaki (JP)

(72) Inventor: Masato Sasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 787 days.

(21) Appl. No.: 17/191,756

(22) Filed: Mar. 4, 2021

(65) Prior Publication Data

US 2021/0191692 A1 Jun. 24, 2021

Related U.S. Application Data

(63) Continuation of application No. PCT/JP2018/033992, filed on Sep. 13, 2018.

(51) Int. Cl.
*G06F 7/58* (2006.01)
*G06F 17/11* (2006.01)

(52) U.S. Cl.
CPC ............... *G06F 7/58* (2013.01); *G06F 7/584* (2013.01); *G06F 17/11* (2013.01)

(58) Field of Classification Search
CPC ..... G06F 7/58–586; G06F 17/11; G06N 5/01; G06N 7/01
See application file for complete search history.

(56) References Cited

U.S. PATENT DOCUMENTS 5,412,665 A 5/1995 Gruodis et al.
10,795,404 B2 * 10/2020 Yamaoka ............... G06F 15/80
(Continued)

FOREIGN PATENT DOCUMENTS

JP H05-204891 A 8/1993
JP H07-141323 A 6/1995
(Continued)

OTHER PUBLICATIONS

Matsumoto et al. "Pseudo Random Number Generation System" is a Machine Translation of JP-2011128655-A (Year: 2011).*
(Continued)

*Primary Examiner* — Andrew Caldwell
*Assistant Examiner* — Carlo Waje
(74) *Attorney, Agent, or Firm* — Fujitsu Intellectual Property Center

(57) ABSTRACT

An optimization apparatus includes hardware circuits configured to function as a random number generator configured to operate either in a first operation mode in which to generate a random number sequence after performing an initialization or in a second operation mode in which to generate a random number sequence without performing the initialization, an annealing calculation unit configured to perform an annealing process by use of random numbers generated by the random number generator, and an operation instruct unit configured to cause the random number generator to start operating in the first operation mode when the annealing calculation unit starts the annealing process, to cause the random number generator to stop operating when the annealing calculation unit, suspends the annealing process, and to cause the random number generator to restart operating in the second operation mode when the annealing calculation unit restarts the annealing process.

6 Claims, 9 Drawing Sheets

(56) References Cited

U.S. PATENT DOCUMENTS

| | | | |
|---|---|---|---|
| 2018/0107172 A1 | 4/2018 | Takatsu | |
| 2018/0136907 A1* | 5/2018 | Bohdan | G06F 7/58 |
| 2018/0218281 A1* | 8/2018 | Reinhardt | G05B 19/042 |
| 2018/0330264 A1* | 11/2018 | Lanting | G06N 10/00 |
| 2019/0130295 A1* | 5/2019 | Okuyama | G06F 17/11 |
| 2019/0155330 A1 | 5/2019 | Yamaoka et al. | |

FOREIGN PATENT DOCUMENTS

| | | | | |
|---|---|---|---|---|
| JP | H07-249023 A | | 9/1995 | |
| JP | 2011128655 A | * | 6/2011 | H04L 9/0662 |
| WO | 2017/033263 A1 | | 3/2017 | |

OTHER PUBLICATIONS

Cypress Semiconductor Corporation: "16-Bit Pseudo Random Sequence Generator Datasheet PRS16 V 3.4 001-13576 Rev.*I", Nov. 10, 2014, pp. 1-11, XP055832563, retrieved from the Internet: URL: https://www.cypress.com/file/136091/download [retrieved on Aug. 17, 2021] *p. 1-p. 3; p. 5-p. 8; p. 1; figure 1*.

Extended European Search Report dated Sep. 1, 2021 for corresponding European Patent Application No. 18933074.9, 9 pages.

International Search Report and Written Opinion of the International Searching Authority (Form PCT/ISA/210), mailed in connection with PCT/JP2018/033992 and mailed Dec. 11, 2018 (Total 1 pages).

* cited by examiner

OPTIMIZATION APPARATUS AND METHOD OF CONTROLLING OPTIMIZATION APPARATUS

CROSS-REFERENCE TO RELATED APPLICATIONS

This application is a continuation application of International Application PCT/JP2018/033992 filed on Sep. 13, 2018, and designated the U.S., the entire contents of which are incorporated herein by reference.

FIELD

The disclosures herein relate to an optimization apparatus and a method of controlling an optimization apparatus.

BACKGROUND

An optimization problem is the problem of finding a point (i.e., solution) belonging to search space that minimizes the value of an objective function defined in the search space. When the search space is a discrete set having a finite number of elements, the minimum value can be found in an exhaustive manner by comparing objective function values that are calculated at all the points belonging to the search space. As the number of dimensions of the search space increases, the number of elements in the set increases explosively, which makes it substantially impossible to perform an exhaustive search.

RELATED-ART DOCUMENTS

Patent Document

[Patent Document 1] Japanese Patent Application Publication No. H7-141323
[Patent Document 2] Japanese Patent Application Publication No. H7-249023

SUMMARY

According to an aspect of the embodiment, an optimization apparatus includes hardware circuits configured to function as a random number generator configured to operate either in a first operation mode in which to generate a random number sequence after performing an initialization or in a second operation mode in which to generate a random number sequence without performing the initialization, an annealing calculation unit configured to perform an annealing process by use of random numbers generated by the random number generator, and an operation instruct unit configured to cause the random number generator to start operating in the first operation mode when the annealing calculation unit starts the annealing process, to cause the random number generator to stop operating when the annealing calculation unit suspends the annealing process, and to cause the random number generator to restart operating in the second operation mode when the annealing calculation unit restarts the annealing process.

The object and advantages of the embodiment, will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
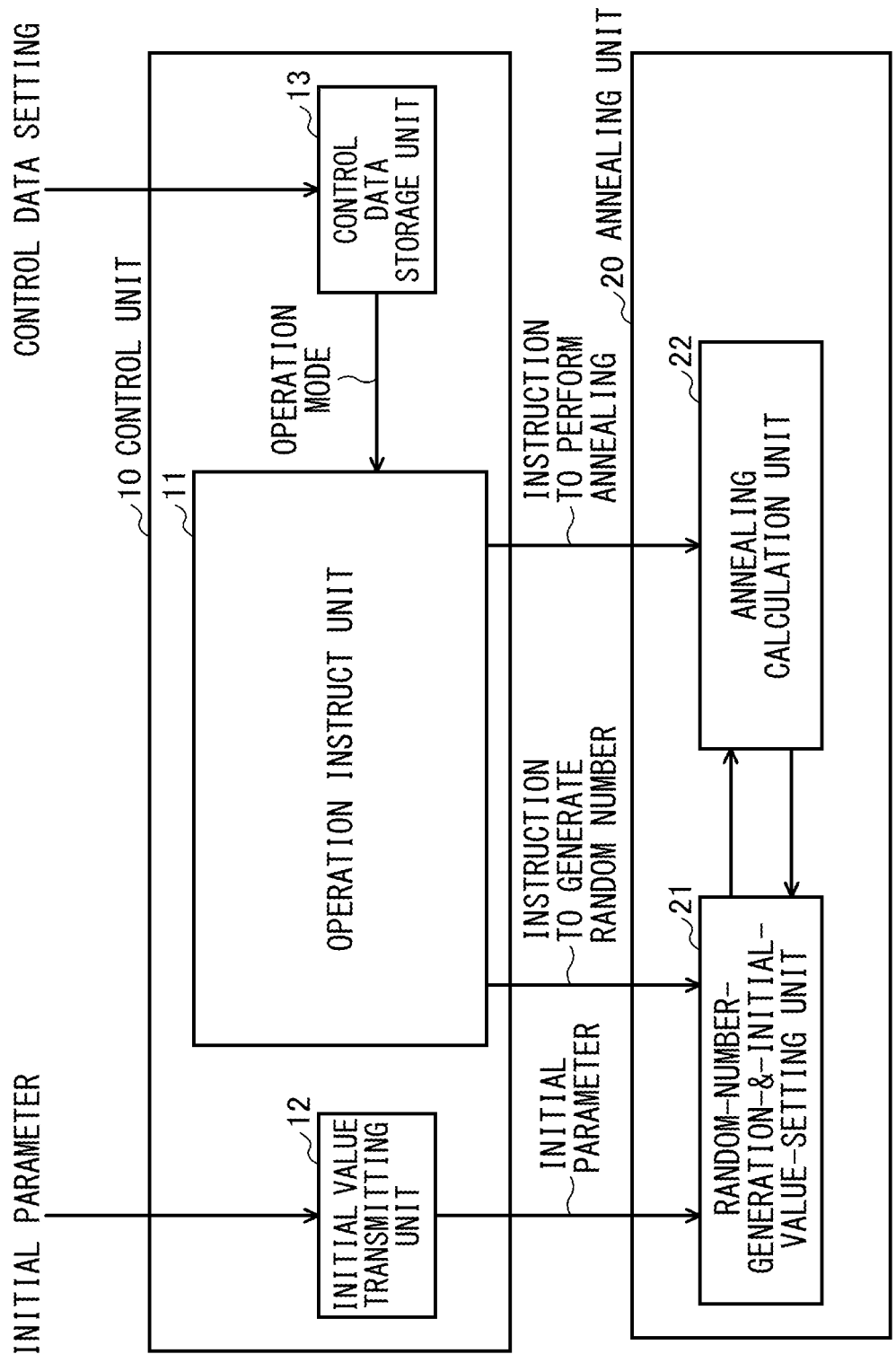
FIG. 1 is a drawing illustrating an example of the configuration of an optimization apparatus.

Simulated annealing mimics a metal annealing process that yields a crystal structure with few defects by gradually cooling a metal. Each point belonging to the search space corresponds to a respective state of physical phenomena, and the objective function corresponds to the energy of the system at each state. The concept of temperature is introduced to the probability of occurrence of each state. A probability distribution is then configured such that at any given temperature, the smaller the energy at a state is, the higher the probability of occurrence of the state is, and such that the lower the temperature is, the greater the ratio between the probabilities of occurrences of two states having different energies is. Lowering temperature at a sufficiently slow rate, while creating successive states with gradual state changes such as to realize the above-noted probability distribution, may allow the state to be converged on an optimum solution having the smallest energy value.

When a change from the energy of a current state to the energy of a next state is denoted as $\Delta E$, the probability P of a transition from the current state to the next state is calculated as the value of a function having $\Delta E$ and temperature as variables. Lowering temperature at a sufficiently slow rate, while performing state transitions with the probability P, allows the state to be converged on an optimum solution having the smallest energy value. In an annealing process, generally, a uniform random number r ($0<r<1$) is used in order to achieve the act of making a transition to a next state with the probability P. State transition is controlled such that, upon comparison of the uniform random number r with the probability P, a result of $P>r$ causes a state transition, and a result of $P \leq r$ does not cause a state transition.

A true random number is difficult to generate by use of a circuit. Typically, a pseudo random number is used chat is generated by deterministic calculations performed by a pseudo random number generator such as a linear feedback shift register or a Mersenne twister. In the case of using such a pseudo random number, upon determining an initial value setting (i.e., the seed), the sequence of random numbers generated thereafter is a deterministic sequence responsive to the seed. As a result, two random number sequences having the same seed are completely the same random number sequence.

In an optimization apparatus, there may be a need in some cases to check intermediate statuses during an annealing process for the purpose of tuning the annealing process or the like. For example, parameters such as spin values and energy values may be read out from the optimization apparatus at every 100-th iteration with respect to a problem in which a state may converge on a solution close to the optimum solution after 1000 iterations (i.e., 1000 state transitions). In order to read out the parameters, the annealing process by the optimization apparatus is temporarily suspended, and, then, the parameters are read from the internal registers of the apparatus to the outside.

The purpose is to know the intermediate statuses leading to the final result that will be obtained after performing 1000 iterations. Because of this, the final result and intermediate statuses are preferably identical between the case in which 1000 iterations are continuously performed and the case in which 1000 iterations are intermittently performed by running 100 iterations at a time. In a conventional optimization apparatus, however, a random number generator continues functioning to keep generating random numbers during other operations of the optimization apparatus in addition to an annealing process, such as during the reading of parameters. Namely, a random number generation process by the random number generator is being performed independently of the running and suspending of an annealing process. As a result, a random number sequence used in an annealing process is different between the case in which 1000 iterations are continuously performed and the case in which 1000 iterations are intermittently performed by running 100 iterations at a time. This gives rise to a problem that the final result and intermediate statuses differ.

In the following, embodiments of the invention will be described with reference to the accompanying drawings.

FIG. 1 is a drawing illustrating an example of the configuration of an optimization apparatus. In FIG. 1 and the subsequent similar drawings, boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together.

The optimization apparatus illustrated in FIG. 1 includes a control unit 10 and an annealing unit 20. The control unit includes an operation instruct unit 11, an initial value transmitting unit 12, and a control data storage unit 13. The annealing unit 20 includes a random-number-generation-&-initial-value-setting unit 21 and an annealing calculation unit 22.

The annealing calculation unit 22 of the annealing unit 20 performs an annealing process by successively changing a state stored in an internal register. The annealing calculation unit 22 calculates an evaluation function value responsive to each state as the energy of each state, and controls a transition from a current state to a next state based on the evaluation function value and current temperature.

Specifically, the annealing calculation unit 22 calculates the evaluation function value E of the current state S, and also calculates the evaluation function value E' of a candidate next state S' that has a slight change from the current state S, followed by calculating a difference $\Delta E$ (=E'−E). In the case in which the Boltzmann distribution is used to represent the probability distribution of a state S and the Metropolis method is used, for example, probability P with which a transition to the next state S' occurs may be defined by the following formula.

$$P = \min[1, \exp(-\beta \Delta E)] \quad (1)$$

Here, $\beta$ is thermodynamic beta (i.e., the reciprocal of absolute temperature T), and is equal to 1/T. The function min[1, x] assumes a value of 1 or a value of x, whichever is smaller. According to the above formula, a transition to the next state occurs with probability "1" in the case of $\Delta E \leq 0$, and a transition to the next state occurs with probability P (=exp($-\beta \Delta E$)) in the case of $0 < \Delta E$. The Metropolis method is a non-limiting example, and other transition control algorithms such as Gibbs sampling may alternatively be used.

The form of the evaluation function is not limited to a particular form, and may be an energy function based on an Ising model, for example, as shown below.

$$E(S) = -\Sigma \Sigma W_{ij} x_i x_j - \Sigma b_i x_i \quad (2)$$

Here, $\Sigma$ represents a sum with respect to the suffix i or j from 1 to M (M: positive integer). The state S is a state having M spins as follows.

$$S_i = (x_1, x_2, \ldots, x_M) \quad (3)$$

Each spin assumes a value of −1 or +1. $W_{ij}$ is a weighting factor for the coupling between spins, and may be such that $W_{ij} = 0$. Further, $b_i$ is a bias.

The probability P defined by the formula (1) and the evaluation function E defined by the formula (2) are examples only. The probability and evaluation function used for an annealing process are not limited to the noted probability and evaluation function. Further, the annealing unit 20 may be such that a plurality of annealing calculation units 22 calculate state transitions in a plurality of systems in parallel, rather than a single annealing calculation unit 22 calculating a state transition in a single system.

In an annealing process performed by the annealing calculation unit 22, a uniform random number r (0<r<1) generated by the random-number-generation-&-initial-value-setting unit 21 is used in order to achieve the act of making a transition to a next state with the probability P. State transition is controlled such that, upon comparison of the uniform random number r with the probability P, a result of P>r causes a state transition, and a result of P≤r does not cause a state transition. For example, the probability $P_i$ of inversion with respect to each of the spins $x_i$ (i=1 to M) in the above-noted formula (3) may be calculated as the probability P defined by the formula (1) with respect to an inversion of the spin of interest. Then, inversion rules may be such that the spin can be inverted when $P_i > r$, and should not be inverted when $P_i \leq r$. In this case, one of the spins for which the rules allow spin inversion is randomly selected, and is inverted to achieve a state transition.

Each time the annealing calculation unit 22 compares the probability P with the uniform random number r, this uniform random number r may be a random number newly generated by the random-number-generation-&-initial-value-setting unit 21. The random-number-generation-&- initial-value-setting unit 21 generates random numbers in synchronization with the advancement of an annealing process, and also sets the initial values of a state S (i.e., the initial values of respective spins), the weighting factors $W_{ij}$ for coupling between the spins, the biases bi, and temperature values in the annealing calculation unit 22 at the start of the annealing process.

The control unit 10 controls the operation of the annealing unit 20. The initial value transmitting unit 12 of the control unit 10 transmits the initial parameters set from an external source (i.e., the initial values of a state S, the weighting factors $W_{ij}$ for coupling between the spins, the biases bi, temperature values, and the like) to the random-number-generation-&-initial-value-setting unit 21 of the annealing unit 20. The control data storage unit 13 of the control unit 10 stores therein control data set from an external source (i.e., an iteration count limit and data indicative of an operation mode). The operation instruct unit 11 of the control unit 10 controls the random number generation process of the random-number-generation-&-initial-value-setting unit 21 and the annealing process of the annealing calculation unit 22 based on the control data stored in the control data storage unit 13.

The portion (i.e., random number generator) of the random-number-generation-&-initial-value-setting unit 21 operates either in a first operation mode in which to generate a random number sequence after performing an initialization or in a second operation mode in which to generate a random number sequence without performing such an initialization. In general, a random number generator performs initialization such as setting a seed value and initializing memory areas before performing a process of generating a random number sequence. In the first operation mode, such an initialization is performed, followed by performing a process of generating a random number sequence. In the second operation mode, such an initialization is not performed, and a process of generating a random number sequence is performed based on the existing status of internal registers, memories, and the like at that point in time. Accordingly, use of the second operation mode at the time of restarting a random number generation process after temporarily suspending a random number generation process makes it possible to generate the same random number sequence as in the case in which a random number generation process is continuously performed without any interruptions.

At the time the annealing calculation unit 22 suspends an annealing process, the random number generator may suspend its operation, and may retain the internal states existing at the time of suspension. At the time the annealing calculation unit 22 restarts the annealing process, the random number generator may restart its operation from the internal states existing at the time of suspension, without performing initialization. This arrangement reliably generates the same random number sequence as in the case in which a random number generation process is continuously performed without any interruptions.

In the following description, for the sake of ease of understanding, the first operation mode is referred to as a normal operation mode, and the second operation mode is referred to as a continuation operation mode.

Which one of the operation modes is used for the operation of the random number generator is determined by the operation instruct unit 11 based on the control data supplied from the control data storage unit 13. The operation instruct unit 11 causes the random number generator to start operating in the normal operation mode when causing the annealing calculation unit 22 to perform an annealing process from the initial state. In order to cause the random number generator to operate in the normal operation mode, a user may set data in the control data storage unit 13 which provides an express indication of the normal operation mode from outside the optimisation apparatus. Alternatively, the number of iterations that have been performed in a particular annealing process may be kept of record, and the random number generator may be controlled to operate in the normal operation mode when the number is zero at the start or restart of the particular annealing process.

The operation instruct unit 11 stops the operation of the random number generator when the annealing calculation unit 22 suspends an annealing process upon completing the execution of a predetermined number of iterations. The number of iterations is the number of state transitions performed by the annealing calculation unit 22.

The operation instruct unit 11 causes the random number generator to restart its operation in the continuation operation mode when causing the annealing calculation unit 22 to resume the annealing process. In order to cause the random number generator to operate in the continuation operation mode, a user may set data in the control data storage unit 13 from outside the optimization apparatus at the restart of the annealing process, and the data provides an express indication of the continuation operation mode Alternatively, the number of iterations that have been performed in a particular annealing process may be kept of record, and the random number generator may be controlled to operate in the continuation operation mode when the number is not zero at the start or restart of the particular annealing process.

Figure 2:
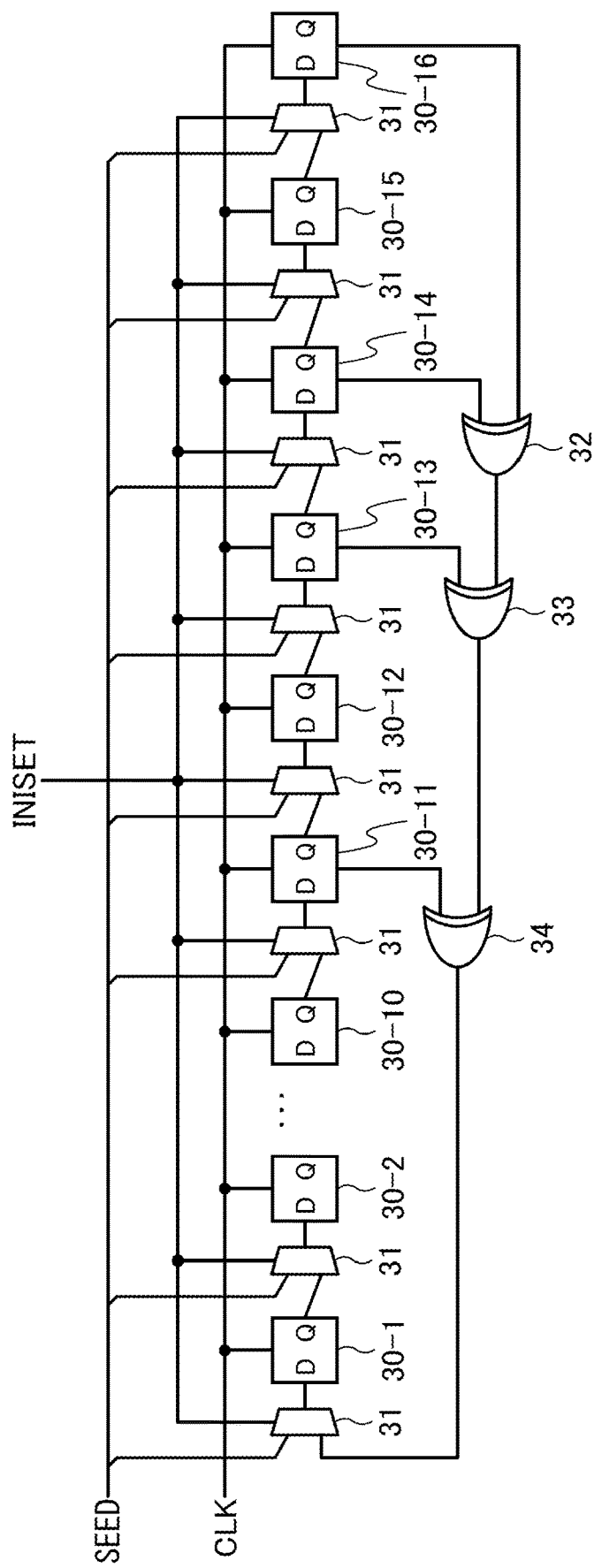
FIG. 2 is a drawing illustrating an example of the configuration of a random number generator embedded in a random-number-generation-&-initial-value-setting unit.

FIG. 2 is a drawing illustrating an example of the configuration of the random number generator embedded in the random-number-generation-&-initial-value-setting unit 21. The random number generator illustrated in FIG. 2 which is a linear feedback shift register includes 16 flip-flops 30-1 through 30-16, 16 selectors 31, and XOR gates 32 through 34.

The flip-flops 30-1 through 30-16 are connected in series such that a data output Q is coupled to a data input D, thereby constituting a shift register which operates in synchronization with a clock signal CLK. The XOR gates 32 through 34 calculate an exclusive OR of the 11-th, 13-th, 14-th, and 16-th flip-flops, and the calculated outcome is applied as a feedback input to the first flip-flop 30-1 of the shift register. This feedback input, achieves a linear feedback shift register.

The selectors 31 are provided in one-to-one correspondence with the flip-flops 30-1 through 30-16 to select either the input for shift operations or a seed value SEED (16 bits) for initialization. The values selected by the selectors 31 are loaded into the flip-flops 30-1 through 30-16 in synchronization with the clock signal CLK. At the time of initialization, an initialization signal INISET may be set to 1, for example. In response to this, the 16 selectors 31 select the 16 respective bits of the seed value SEED. The 16 respective bits of the seed value SEED are then stored in the 16 flip-flops 30-1 through 30-16. At the time of shift operations, the initialization signal INISET may be set to 0, for example. In response to this, the selectors 31 select the inputs for shift operations (i.e., the outputs of the preceding flip-flops or the feedback input). The selected values are then stored in the 16 flip-flops 30-1 through 30-16.

After setting the seed value at the initialization, shift operations are successively performed in synchronization with the clock signal CLK, so that the linear feedback shift register generates a random number sequence. Outputting an N-bit random number as a uniform random number r is achieved by consolidating N successive outputs of the XOR gate 32 as a uniform random number r. Alternatively, an XOR gate may be provided to calculate an XOR of the outputs Q of a two or more predetermined number of flip-flops among the flip-flops 30-1 through 30-16. N successive outputs of the XOR gate may then be output as a uniform random number r.

In the normal operation mode described above, the initialization signal INISET may be set to 1, for example, to set the seed value SEED to the flip-flops 30-1 through 30-16 in synchronization with the clock signal CLK to perform initialization. After the initialization, the initialization signal INISET may be set to 0, for example, to perform shift operations successively in synchronization with the clock signal CLK, thereby generating a random number sequence.

In order to suspend a random number generation process, the pulses of the clock signal CLK may be stopped from being supplied so as to retain the bit values stored in the flip-flops 30-1 through 30-16. The initialization signal INISET is kept, in the state in which it is set to 0.

In the continuation operation mode previously described, while keeping the state in which the initialization signal INISET is set to 0, the pulses of the clock signal CLK are supplied again to perform shift operations successively in synchronization with the clock signal CLK, thereby generating a random number sequence. Namely, shift operations are successively performed to generate a random number sequence as a continuation from the state in which the values stored in the flip-flops 30-1 through 30-16 are the same as at the time of suspension.

Use of a linear feedback shift register as illustrated in FIG. 2 as a random number generator enables the generation of pseudo-random numbers by use of a simple, small-scale circuit configuration. In the case of the linear feedback shift register illustrated in FIG. 2, the period of pseudo-random numbers is 65535.

Figure 3:
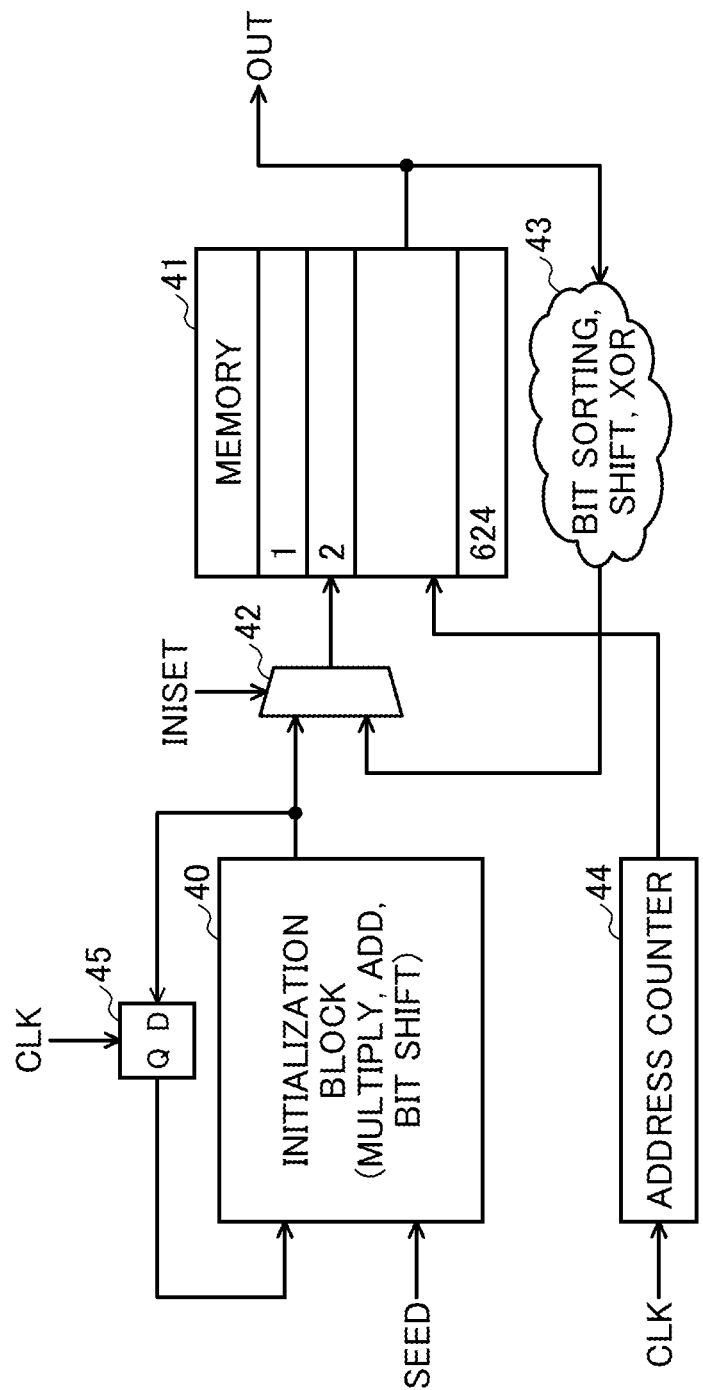
FIG. 3 is a drawing illustrating another example of the configuration of the random number generator embedded in the random-number-generation-&-initial-value-setting unit.

FIG. 3 is a drawing illustrating another example of the configuration of the random number generator embedded in the random-number-generation-&-initial-value-setting unit 21. The random number generator illustrated in FIG. 3 which is a Mersenne twister includes an initialization block 40, a memory circuit 41, a selector circuit 42, a combinatorial logic circuit 43, an address counter 44, and a flip-flop 45.

The memory circuit 41 has addresses 1 through 624, each of which stores therein 1-word (i.e., 32 bits) data. At the time of initialization, the initialization signal INISET may be set to 1, for example, to place the selector circuit 42 in such a state as to select the output value of the initialization block 40. The initialization block 40 performs predetermined arithmetic operations based on a seed value SEED such as multiplication, addition, and bit shifts so as to calculate and output values that are to be stored in the respective addresses of the memory circuit 41. The output values calculated by the initialization block 40 are successively stored via the selector circuit 42 in the respective addresses 1 through 624 of the memory circuit 41 in the first cycle to the 624-th cycles of the initialization process. In so doing, the address value indicated by the address counter 44 successively increases from 1 to 624 in synchronization with the clock signal CLK. In the first cycle of the initialization process, the initialization block 40 calculates an output value by performing a predetermined arithmetic operation on the seed value SEED. The output value calculated by the initialization block 40 is stored in the memory circuit 41 and also stored in the flip-flop 45. In the second cycle through the 624-th cycle, the initialization block 40 calculates output values by performing predetermined arithmetic operations on the value stored in the flip-flop 45.

As a further initialization process following after the above-described process, the initialization signal INISET may be set to 0, for example, to place the selector circuit 42 in such a state as to select the output value of the combinatorial logic circuit 43. The combinatorial logic circuit 43 may then perform arithmetic operations on the values stored at the respective addresses of the memory circuit 41. Specifically, the stored values may be retrieved from the memory circuit 41 in response to the address value indicated by the address counter 44, and, then, the combinatorial logic circuit 43 performs arithmetic operations inclusive of bit shifts, EXOR, multiplication, and addition, followed by writing the result of the operation back to the memory circuit 41. With this, the initialization process comes to an end.

At the time of a random number generation process following the initialization, the initialization signal INISET may be set to 0, for example, to place the selector circuit 42 in such a state as to select the output value of the combinatorial logic circuit 43. The address counter 44 outputs addresses in synchronization with the clock signal CLK so that the stored values are retrieved from the memory circuit 41 in response to these addresses. The combinatorial logic circuit 43 performs predetermined arithmetic operations inclusive of AND, OR, bits shifts, XOR, and the like on the received retrieved values. The calculated values are then stored via the selector circuit 42, at the addresses in the memory circuit 41 indicated by the address counter 44. At the (624n+1)-th random number generation (n: integer greater than or equal to 0), a process is performed that updates the values stored in the respective addresses 1 through 624 in the memory circuit 41 as described above. The address counter 44 thereafter outputs an address that is successively increased from 1 to 624, and the stored values are retrieved from such addresses in the memory circuit 41. Random numbers are generated by performing predetermined arithmetic operations inclusive of bit shifts, AND, and XOR on the retrieved values. In this manner, (624n+m)-th random number generations (m: integer from 1 to 624) are performed. Thereafter, the process described above is repeated multiple times.

In the normal operation mode described above, the initialization signal INISET may be set to 1, for example, to set initial values to the respective addresses 1 through 624 in the memory circuit 41 in synchronization with the clock signal CLK to perform initialization. After the initialization, the initialization signal INISET may be set to 0, for example, to perform retrieval from the memory circuit 41 and arithmetic: operations by the combinatorial logic circuit 43 successively in synchronization with the clock signal CLK, thereby generating a random number sequence.

In order to suspend a random number generation process, the pulses of the clock signal CLK may be stopped from being supplied so as to retain the values stored in the memory circuit 41. Further, the internal state of the address counter 44 (i.e., the output address value) may also be retained. Moreover, the initialization signal INISET may be kept in the state in which it is set to 0.

In the continuation operation mode previously described, while keeping the state in which the initialization signal INISET is set to 0, the pulses of the clock signal CLK are supplied again to perform retrieval from the memory circuit 41 and arithmetic operations successively in synchronization with the clock signal CLK, thereby generating a random number sequence. Namely, retrieval from the memory circuit 41 and arithmetic operations are successively performed to generate a random number sequence as a continuation from the state in which the output address value of the address counter 44 and the stored values of the memory circuit 41 are the same as at the time of suspension.

Use of a Mersenne twister as illustrated in FIG. 3 as a random number generator enables the generation of high-quality pseudo-random numbers. In the case of the Mersenne twister illustrated in FIG. 3, the period of pseudo-random numbers is $2^{19337}-1$, which is an extremely long length.

Figure 4:
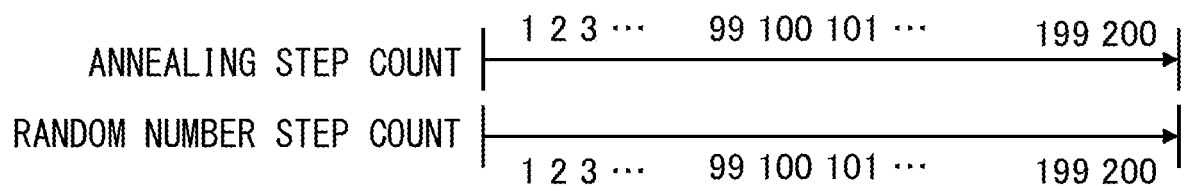
FIG. 4 is a drawing illustrating a synchronous relationship in step counts between an annealing process and a random number generation process in the case in which the iterations of the annealing process are continuously performed.

FIG. 4 is a drawing illustrating a synchronous relationship in step counts between an annealing process and a random number generation process in the case in which the iterations of the annealing process are continuously performed. As illustrated in FIG. 4, when the iterations of an annealing process are continuously performed from the first round to the 200-th round, the step count of a random number generation process also increases in synchronization with increases in the number of iterations of the annealing process (i.e., the step count illustrated in FIG. 4). Here, the step count of a random number generation process is a number obtained by counting, as one step, a random number generation process that generates a number of random numbers used in a single iteration of the annealing process.

Figure 5:
FIG. 5 is a drawing illustrating a synchronous relationship in step counts between an annealing process and a random number generation process in the case in which the annealing process is temporarily suspended and restarted.

FIG. 5 is a drawing illustrating a synchronous relationship in step counts between an annealing process and a random number generation process in the case in which the annealing process is temporarily suspended and restarted. As illustrated in FIG. 5, when the iterations of an annealing process are suspended after 100 rounds, the step count of a random number generation process also stops after successively increasing from 1 to 100, in synchronization with the stopping of the step count of the annealing process upon successively increasing from 1 to 100. After the suspension, the values of the internal registers of the annealing calculation unit 22 are read from the outside by taking 500 clock cycles, for example. Thereafter, the annealing process restarts from the 101-th iteration. In synchronization with the step count of the annealing process that stops upon successively increasing from 101 to 200, the step count of the random number generation process also stops upon successively increasing from 1 to 100.

In the optimization apparatus of the present disclosures, the operations in "synchronization", regarding the annealing process and the random number generation process that operate in synchronization with each other when starting, suspending, and restarting their operations, does not have to be operations that are synchronized with a common clock signal used across the entirety of the optimization apparatus. For example, the phrase "suspend the operations in synchronization" does not have to refer to the suspension of operations of the annealing process and the random number generation process at the same cycle of a common clock signal. It suffices for the operations "in synchronization" to be operations that can maintain conditions in which random numbers generated by the random number generation process are in one-to-one correspondence to random numbers used in the annealing process. Namely, the condition is satisfactory if the one-to-one correspondence does not collapse as in the cases in which the random number generation process generates excessive random numbers that are not used by the annealing process, or in which a random number generated by the random number generation process is used twice erroneously by the annealing process.

In other words, it suffices for one-to-one correspondence to be kept, without an excess or a deficit, between the random numbers generated by the random number generator and the random numbers utilized by the annealing calculation unit both before and after the annealing calculation unit suspends and resumes the annealing process. With this arrangement, synchronization is established on a step-by-step basis or on a random-number-by-random-number basis, even if synchronization is not established on a clock-pulse-by-clock-pulse basis. As a result, the objective to generate the same annealing results between continuous execution and intermittent execution is more readily achieved.

The optimization apparatus illustrated in FIG. 1 is provided with the normal operation mode and the continuation operation mode for a random number generation process as previously described, and may selectively use one of these. As a result, when the annealing process and the random number generation process are synchronized both before and after a suspension as illustrated in FIG. 5, a random number sequence can be generated that is the same as when the annealing process is continuously performed as illustrated in FIG. 4. The final calculation results and intermediate statuses obtained by the annealing calculation unit can thus be completely matched between the continuous execution of the annealing process and the intermittent execution of the annealing process.

Figure 6:
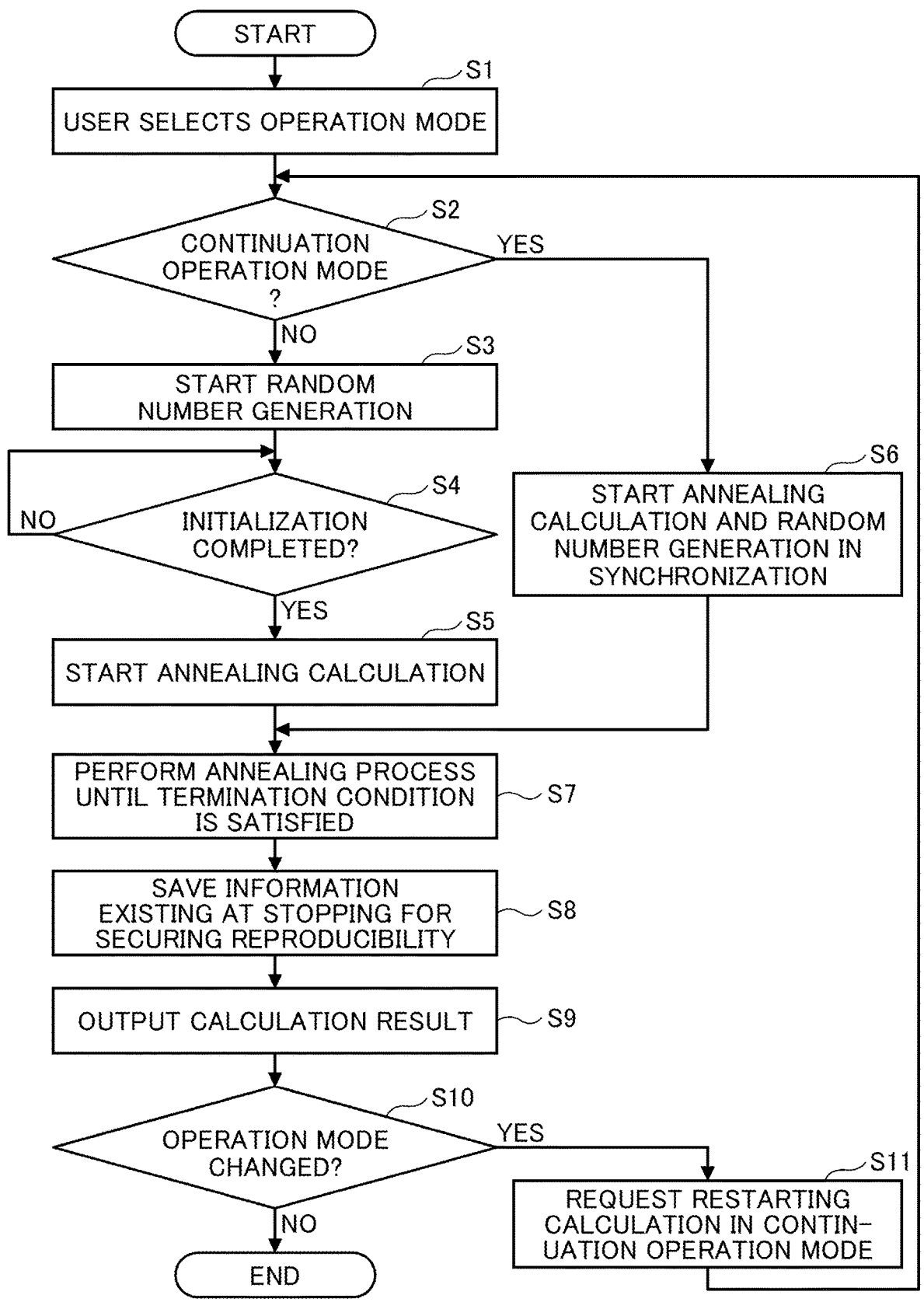
FIG. 6 is a flowchart illustrating an example of the operation of the optimization apparatus illustrated in FIG. 1.

FIG. 6 is a flowchart illustrating an example of the operation of the optimization apparatus illustrated in FIG. 1. This example illustrates the operation of the optimization apparatus when a user specifies an operation mode as appropriate.

In FIG. 6 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent, that the B step can be performed before the A step is performed. Despite the explanation chat the A step is performed before the B step, such a description is not intended to place the obvious case as described above outside the scope of the disclosed technology. Such an obvious case inevitably falls within the scope of the technology intended by this disclosure.

In step S1, the user of the optimization apparatus selects an operation mode. For an annealing process that is started for the first time in the optimization apparatus, the user selects the normal operation mode, which causes data indicative of the normal operation mode to be stored in the control data storage unit 13 of the optimization apparatus.

In step S2, the optimization apparatus starts operating, and the operation instruct unit 11 refers to the data indicative of an operation mode stored in the control data storage unit 13 to determiiie whether the operation mode setting is the continuation operation mode. When it is found that the operation mode setting is not the continuation operation mode, the procedure proceeds to step S3.

In step S3, the operation instruct unit 11 instructs the random-number-generation-&-initial-value-setting unit 21 to start generating random numbers in the normal operation mode. In response to this instruction, the random number generator of the random-number-generation-&-initial-value-setting unit 21 first performs initialization. At step S4, the random number generator checks whether the initialization is completed. The check in step S4 is repeated until the initialization is completed. Upon completion of the initialization, the procedure proceeds to step S5, in which the operation instruct unit 11 instructs the annealing calculation unit 22 to start an annealing process. The annealing calculation unit 22 starts an annealing process, and the random number generator generates a random number sequence used in the annealing process.

When it is found in step S2 that the operation mode setting is the continuation operation mode, the procedure proceeds to step S6. In step S6, the operation instruct unit 11 instructs the annealing calculation unit 22 to perform an annealing process, and also instructs the random-number-generation-&-initial-value-setting unit 21 to generate random numbers. In response to these instructions, the annealing calculation unit 22 restarts the annealing process, and the random number generator of the random-number-generation-&-initial-value-setting unit 21 generates a random number sequence used in the annealing process. The annealing process by the annealing calculation unit 22 and the random number generation process by the random number generator are controlled to proceed in synchronization with each other.

In step S7, the annealing calculation unit 22 performs the annealing process until a termination condition is satisfied. The termination condition may be an iteration count limit stored in the control data storage unit 13. When the termination condition is satisfied, the annealing process by the annealing calculation unit 22 is brought to an end. In synchronization with the end of the annealing process, the random number generation process by the random number generator of the random-number-generation-&-initial-value-setting unit 21 is also brought to an end.

The synchronization control in step S6 and step S7 may be achieved by communication between the annealing calculation unit 22 and the random-number-generation-&-initial-value-setting unit 21, or may be achieved by an instruction from the operation instruct unit 11 (e.g., an instruction to perform an iteration on an iteration-by-iteration basis). Alternatively, the random number generator may have been notified of a predetermined iteration count limit by the operation instruct unit 11 in advance, and stops the random number generation process after generating a predetermined number of random numbers corresponding to the predetermined iteration count limit. How to achieve synchronization control is not limited to a particular method.

In step S8, the annealing calculation unit 22 and the random-number-generation-&-initial-value-setting unit 21 retain their internal states existing in the condition in which the operations are suspended The annealing calculation unit 22 may retain all the values stored in the internal registers, such as the spin values of the current state, the values of coupling factors, temperature, the evaluation function value, and the like. Alternatively, the value of the internal registers of the annealing calculation unit 22 may be temporarily evacuated to the random-number-generation-&-initial-value-setting unit 21, so that parameters regarding the annealing process are stored in the registers of the random-number-generation-&-initial-value-setting unit 21. The random number generator of the random-number-generation-&-initial-value-setting unit 21 may retain the internal states regarding random number generation (e.g., the stored values of the flip-flops of a linear feedback shift register or the stored values of the memory circuit of a Mersenne twister).

In step S9, the results of calculation by the annealing calculation unit 22, i.e., the parameter values (the spin values of the current state and the evaluation function value) stored in the internal registers, are sent to the outside. Based on the results of calculation sent to the outside, the user determines whether to continue the annealing process. In the case of continuing the annealing process, the user sets data indicative of the continuation operation mode in the control data storage unit 13 of the optimization apparatus.

In step S10, the operation instruct unit 11 checks whether the operation mode setting has been changed. When the normal operation mode is kept, without a change, the procedures comes to an end. When the operation mode setting has been changed to the continuation operation mode, the user gives instruction to the optimization apparatus in step S11 to restart the annealing process in the continuation operation mode. Thereafter, the procedure returns to step S2, from which the subsequent processes are repeated.

Figure 7:
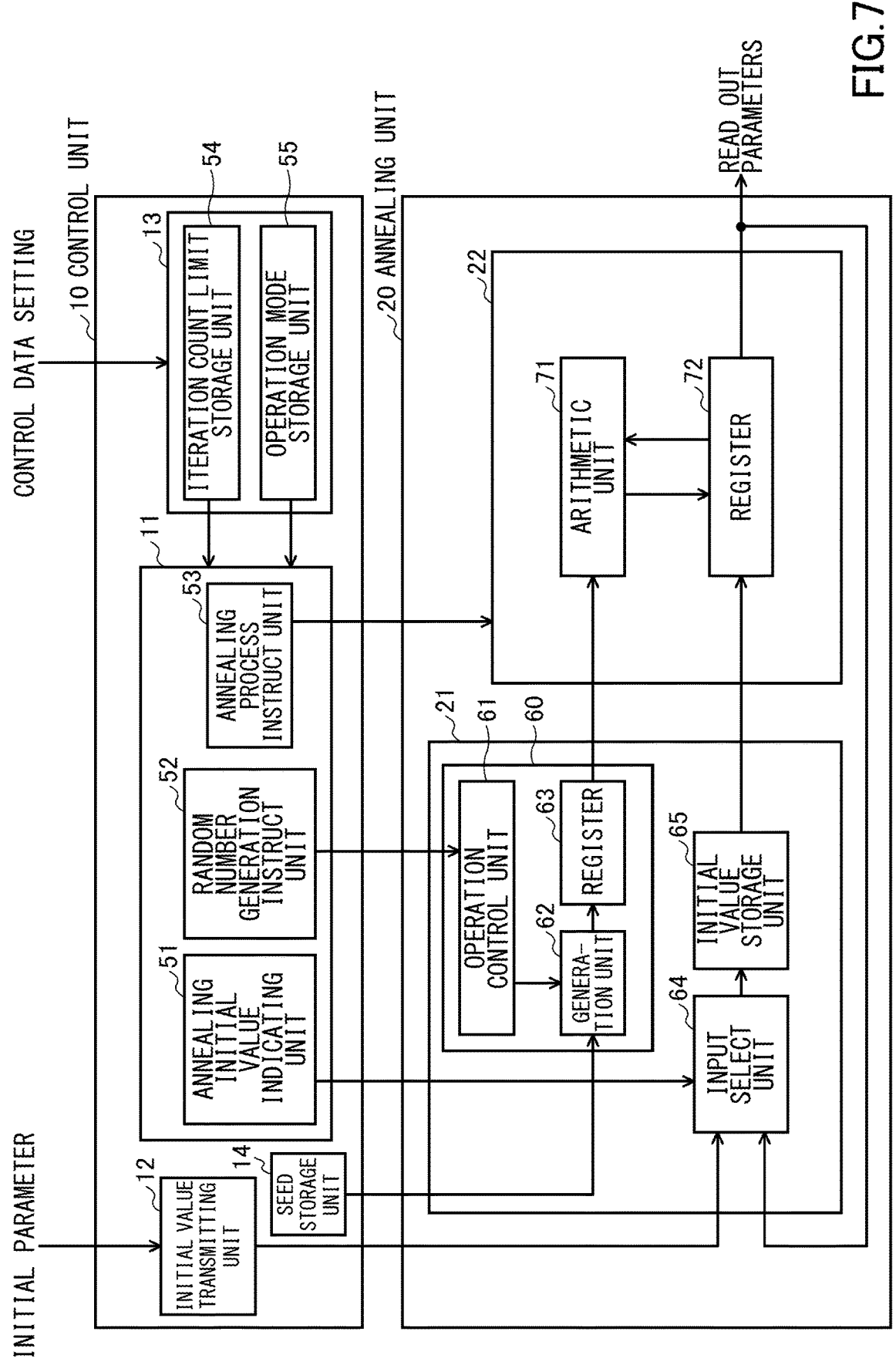
FIG. 7 is a drawing illustrating an example of the more detailed configuration of the optimization apparatus.

FIG. 7 is a drawing illustrating an example of the more detailed configuration of the optimization apparatus. The optimization apparatus illustrated in FIG. 7 includes the control unit 10 and the annealing unit 20.

The control unit includes the operation instruct unit 11, the initial value transmitting unit 12, the control data storage unit 13, and a seed storage unit 14. The operation instruct unit 11 includes an annealing initial value indicating unit 51, a random number generation instruct unit 52, and an annealing process instruct unit 53. The control data storage unit 13 includes an iteration count limit storage unit 54 and an operation mode storage unit 55.

The annealing unit 20 includes the random-number-generation-S-initial-value-setting unit 21 and the annealing calculation unit 22. The random-number-generation-&-initial-value-setting unit 21 includes a random number generator 60, an input select unit 64, and an initial value storage unit 65. The random number generator 60 includes an operation control unit 61, a generation unit 62, and a register 63. The annealing calculation unit 22 includes an arithmetic unit 71 and a register 72.

The random number generation instruct unit 52 of the operation instruct unit 11 causes the random number generator 60 to operate in an indicated operation mode that is either the normal operation mode or the continuation operation mode, based on the data indicative of an operation mode setting supplied from the operation mode storage unit 55. The random number generation instruct unit 52 causes the random number generator to operate in the normal operation mode when the annealing process instruct unit 53 causes the annealing calculation unit 22 to perform an annealing process from the initial state. Specifically, under the control of the operation control unit 61, the generation unit 62 performs initialization based on the seed value supplied from the seed storage unit 14, followed by performing the process of generating a random number sequence. The random numbers generated by the generation unit 62 are successively stored in the register 63.

The annealing initial value indicating unit 51 causes the input select unit 64 to select the initial parameters supplied from the initial value transmitting unit 12 in the case in which the operation mode storage unit 55 indicates the normal operation mode, i.e., in the case in which an annealing process is performed from the initial state As a result, the input select unit 64 outputs the initial parameters from the initial value transmitting unit 12, and these initial parameters are stored in the initial value storage unit 65.

Based on the data indicative of the iteration count limit supplied from the iteration count limit storage unit 54, the annealing process instruct unit 53 causes the annealing calculation unit 22 to perform an indicated number of iterations of an annealing process. Specifically, after the initial parameters from the initial value storage unit 65 are stored in the register 72, the arithmetic unit 71 advances the iterations of the annealing process while controlling state transitions by use of random numbers supplied from the register 63 of the random number generator 60. As the annealing process advances, the parameters stored in the register 72 keep being updated. When the annealing calculation unit 22 suspends the annealing process upon completing the execution of a predetermined number of iterations, the random number generation instruct unit 52 causes the random number generator 60 to stop operating in synchronization with the suspension of the annealing process. Upon the occurrence of suspension, the parameter values of the current state stored in the register 72 may be read out to the outside of the optimization apparatus.

When the annealing process instruct unit 53 causes the annealing calculation unit 22 to restart the annealing process after the suspension of the annealing process, the setting in the operation mode storage unit 55 may be the continuation operation mode. At the time of restarting the annealing process, the random number generation instruct unit 52 causes the random number generator 50 to operate in the continuation operation mode based on the data indicative of the continuation operation mode supplied from the operation mode storage unit 55. Specifically, under the control of the operation control unit 61, the generation unit 62 resumes the operation of generating a random number sequence from the current internal state without performing initialization. The random numbers generated by the generation unit 62 are successively stored in the register 63.

The annealing initial value indicating unit 51 causes the input select unit 64 to select the parameters as existed in the suspended state supplied from the register 72 of the annealing calculation unit 22 in the case in which the operation mode storage unit 55 indicates the continuation operation mode, i.e., in the case in which the annealing process is restarted from the suspended state. As a result, the input select unit 64 outputs the parameters as existed in the suspended state supplied from the register 72, and these parameters are stored in the initial value storage unit 65.

Similarities exist between the case of restarting after the suspension and the case of starting from the initial state, such that the data indicative of the iteration count limit supplied from the iteration count limit storage unit 54 is used as a basis for the annealing process instruct unit 53 to cause the annealing calculation unit 22 to perform an indicated number of iterations of an annealing process. Specifically, after the parameters from the initial value storage unit 65 are stored in the register 72, the arithmetic unit 71 advances the iterations of the annealing process while controlling state transitions by use of random numbers supplied from the register 63 of the random number generator 60. As the annealing process advances, the parameters stored in the register 72 keep being updated.

Figure 8:
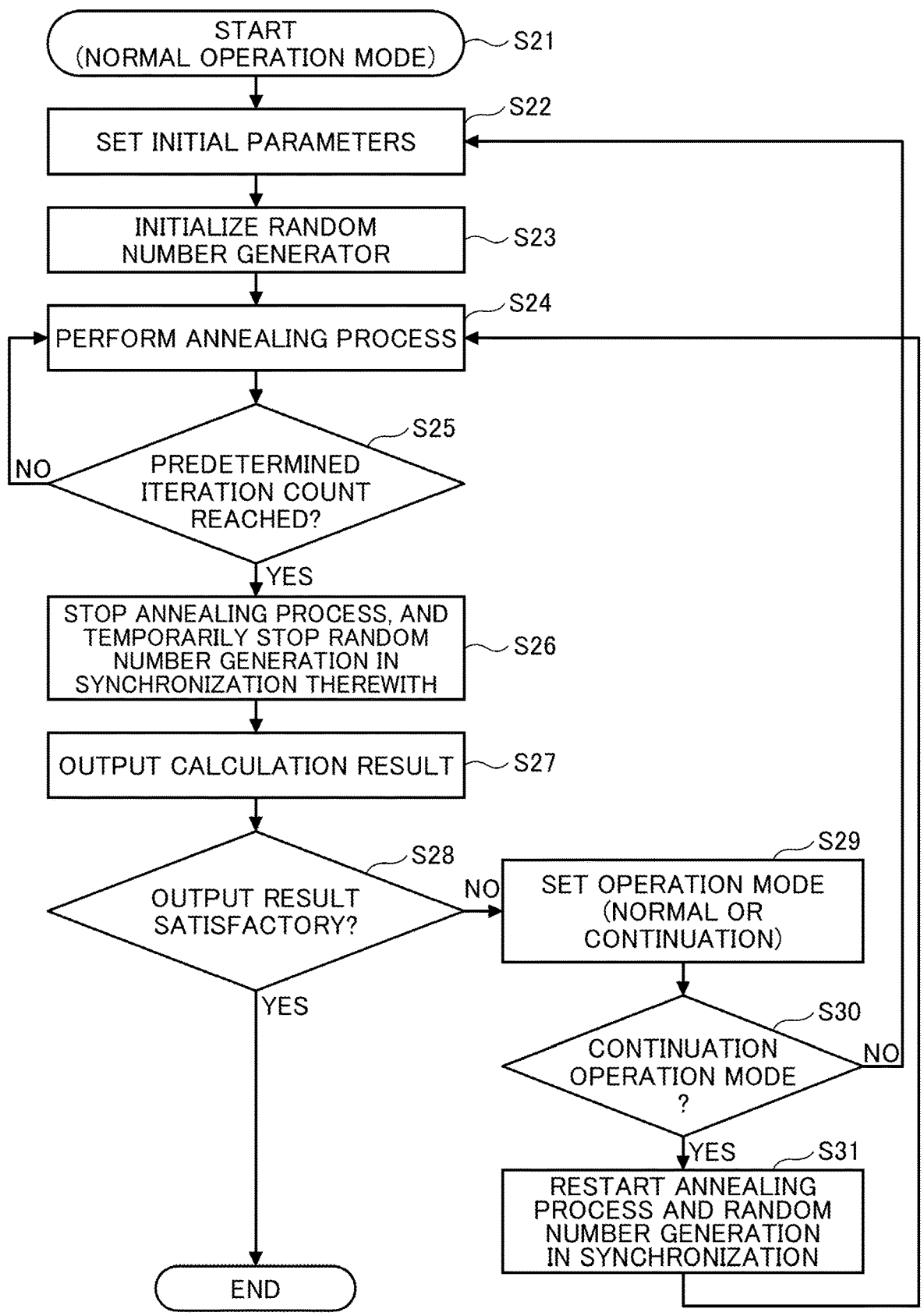
FIG. 8 is a flowchart illustrating an example of the operation of the optimization apparatus illustrated in FIG. 7.

FIG. 8 is a flowchart illustrating an example of the operation of the optimization apparatus illustrated in FIG. 7.

In step S21, the user selects the normal operation mode, and gives instruction to the optimization apparatus to start an annealing process. In so doing, the user sets the initial parameters in the initial value transmitting unit 12, and also sets the iteration count limit and the normal operation mode in the control data storage unit 13.

In step S22, the initial parameters transmitted from the initial value transmitting unit. 12 of the control unit 10 are stored in the initial value storage unit 65 via the input select unit 64 of the annealing unit 20. In step S23, the random number generation instruct unit 52 of the control unit 10 instructs the random number generator 60 to perform initialization. In response, the random number generator 60 performs initialization.

In step S24, the annealing calculation unit 22 performs an annealing process. Specifically, the annealing process instruct unit 53 of the control unit 10 instructs the annealing calculation unit 22 to start an annealing process. In response to this instruction, the annealing calculation unit 22 receives the initial parameters from the initial value storage unit 65, and then performs the annealing process while controlling state transitions based on a random number sequence supplied from the random number generator 60.

In step S25, the annealing process instruct unit 53 or the annealing calculation unit 22 checks whether the state has been updated a number of times equal to the predetermined iteration count limit. The annealing calculation unit 22 performs the annealing process until the predetermined iteration count limit, is reached. Upon reaching the predetermined iteration count limit, the procedure proceeds to step S26.

In step S26, the annealing calculation unit 22 stops the annealing process, and, in synchronization therewith, the random number generator 60 temporarily stops the random number generation process. This synchronization control may be achieved by direct communication between the annealing calculation unit 22 and the random number generator 60, or may be achieved by a stop instruction sent to the random number generator 60 from the operation instruct unit 11 which monitors and controls the operation of the annealing calculation unit 22. Alternatively, the operation control unit 61 of the random number generator 60 may have been notified of a predetermined iteration count limit by the random number generation instruct unit 52 in advance, and stops the random number generation process after generating a predetermined number of random numbers corresponding to the predetermined iteration count limit. How to achieve synchronization control is not limited to a particular method.

In step S27, the parameters indicative of the results of calculation is sent from the register 72 of the annealing calculation unit 22 to the outside of the optimization apparatus. Based on these results of calculation, in step S28, the user determines whether the result of the annealing process is satisfactory. In the case of the result of the annealing process being satisfactory, the procedure comes to an end. In the case of the result of the annealing process being not satisfactory, the procedure proceeds to step S29.

In step S29, the user sets either the normal operation mode or the continuation operation mode in the control data storage unit 13 of the control unit 10. For example, the initial parameters may be modified to perform a next annealing process under different conditions than in this time's annealing process. In such a case, the normal operation mode is chosen to be set. When this time's annealing process is to be resumed from the suspended state without any change, the continuation operation mode is chosen to be set.

In step S30, the random number generation instruct unit 52 of the control unit 10 determines whether the operation mode setting is the continuation operation mode. In the case of the setting being not the continuation operation mode (i.e., in the case of the setting being the normal operation mode), the procedure returns to step S22, in which initial parameters are set again, followed by repeating the subsequent processes. In the case of the setting being the continuation operation mode, in step S31, the annealing process instruct unit 53 instructs the annealing calculation unit 22 to perform (i.e., resume) the annealing process, and the random number generation instruct unit 52 instructs the random number generator 60 to resume the random number generation (i.e., random number generation in the continuation operation mode). In response, the annealing process by the annealing calculation unit 22 and the random number generation by the random number generator 60 are resumed in synchronization with each other. Thereafter, the procedure proceeds to step S24, and the subsequent steps will be repeated Specifically, under the control of the operation control unit 61, the generation unit 62 resumes the operation of generating a random number sequence from the current internal state without performing initialization. The random numbers generated by the generation unit 62 are successively stored in the register 63. The parameters as existed in the suspended state have been stored in the initial value storage unit 65 from the register 72 via the input select unit 64, so that the annealing calculation unit 22 stores the parameters from the initial value storage unit 65 in the register 72 as a first thing after restarting the operation. Thereafter, the arithmetic unit 71 advances the iterations of the annealing process while controlling state transitions by use of random numbers supplied from the register 63 of the random number generator 60. As the annealing process advances, the parameters stored in the register 72 keep being updated.

Figure 9:
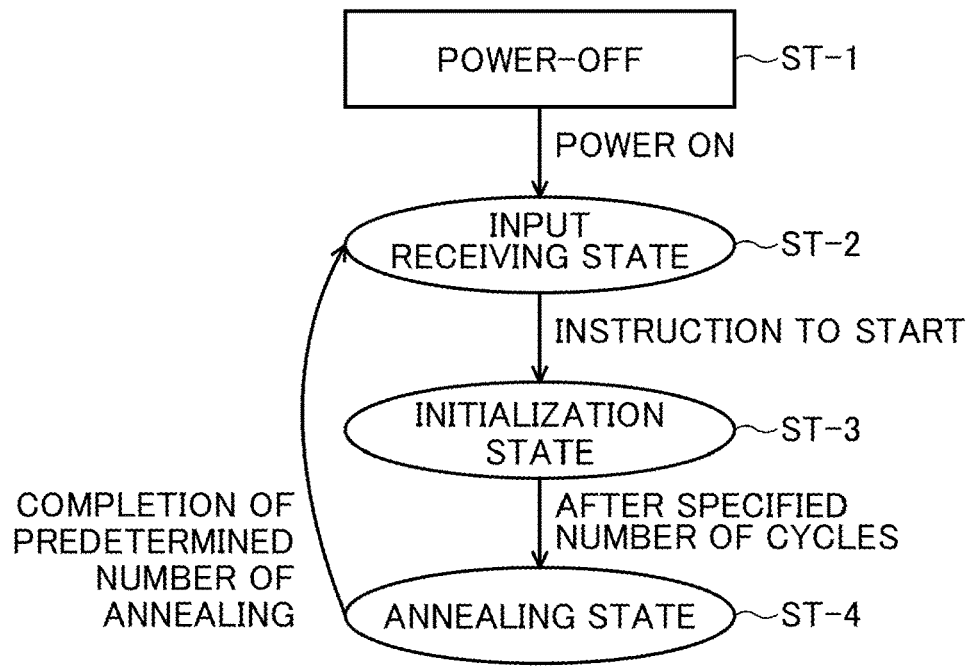
FIG. 9 is a state transition diagram illustrating the transition of an operation state of the optimization apparatus illustrated in FIG. 7 in the normal operation mode.

FIG. 9 is a state transition diagram illustrating the transition of an operation state of the optimization apparatus illustrated in FIG. 7 in the normal operation mode. As the optimization apparatus is powered on in the power-off state ST-1, the operation state of the optimization apparatus makes a transition to an input receiving state ST-2. The input receiving state ST-2 is the state in which the optimization apparatus receives inputs for settings given from an external source, such as the initial parameters (i.e., the spin values of a state, coupling factors, temperature, and the like), an iteration count limit, and an operation mode (i.e., the normal operation mode or the continuation operation mode). The input receiving state ST-2 is also the state in which the optimization apparatus receives instructions input thereto such as an operation start instruction.

As the optimization apparatus receives an operation start instruction in the input receiving state ST-2, the operation state makes a transition to an initialization state ST-3. The initialization state ST-3 is the state in which the random number generator 60 performs initialization in the optimization apparatus. This initialization stores a seed value in the flip-lops of the shift register in the case of a linear feedback shift register, and sets initial values in the respective addresses in the memory circuit in the case of a Mersenne twister. As a predetermined number of clock cycles pass to complete the initialization in the initialization state ST-3, the operation state of the optimization apparatus makes a transition to an annealing state ST-4.

The annealing state ST-4 is the state in which the annealing calculation unit 22 of the optimization apparatus performs an annealing process, with the random number generator 60 generating a random number sequence for use in the annealing process. The state transitions illustrated in FIG. 9 correspond to the case of the normal operation mode, so that the annealing calculation unit 22 receives the initial parameters from the initial value storage unit 65, and, then, performs the annealing process while controlling state transitions based on a random number sequence supplied from the random number generator 60. As execution of a predetermined number of iterations is completed, the operation state of the optimization apparatus makes a transition to the input receiving state ST-2.

Figure 10:
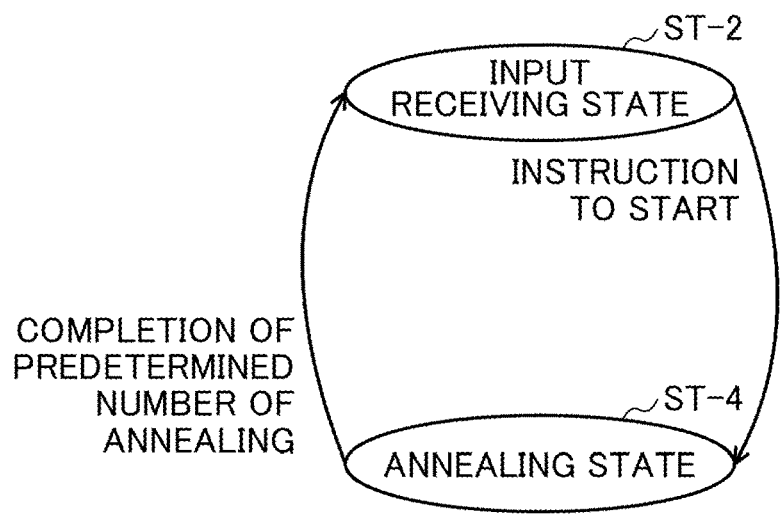
FIG. 10 is a state transition diagram illustrating the transition of an operation state of the optimization apparatus illustrated in FIG. 7 in the continuation operation mode.

FIG. 10 is a state transition diagram illustrating the transition of an operation state of the optimization apparatus illustrated in FIG. 7 in the continuation operation mode. As the optimization apparatus receives an operation start instruction in the input receiving state ST-2, the operation state makes a transition directly to the annealing state ST-4 in the case of the continuation operation mode. The state transitions illustrated in FIG. 10 correspond to the case of the continuation operation mode, so that the annealing calculation unit 22 receives the parameters as existed in the suspended state from the initial value storage unit 65, and, then, performs the annealing process while controlling state transitions based on a random number sequence supplied from the random number generator 60. As execution of a predetermined number of iterations is completed, the operation state of the optimization apparatus makes a transition to the input receiving state ST-2.

According to at least one embodiment, an optimization apparatus is configured such that a random number generator generates proper random numbers during an intermittent execution of an annealing process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optimization apparatus comprising:
a random number generator circuit configured to operate in synchronization with a clock signal, either in a first operation mode in which to generate a random number sequence after performing an initialization or in a second operation mode in which to generate a random number sequence without performing the initialization, the random number generator circuit being initialized by an initialization signal;
an annealing calculation circuit configured to perform an annealing process by use of random numbers generated by the random number generator circuit, and to suspend the annealing process upon completing an execution of a predetermined number of iterations; and
an operation instruct circuit configured to control the random number generator circuit and the annealing calculation circuit,
the operation instruct circuit is configured to cause the random number generator circuit to start operating in the first operation mode by activating the initialization signal to initialize the random number generator circuit and by supplying the clock signal to the random number generator circuit after deactivating the initialization signal, and is configured to cause the annealing calculation circuit to perform the annealing process while the random number generator circuit generates a random number sequence used in the annealing process,
the operation instruct circuit is configured to stop the clock signal to cause the random number generator circuit to stop operating together with a suspension of the annealing process upon completing the execution of the predetermined number of iterations, and the operation instruct circuit is configured to cause the random number generator circuit to restart operating in the second operation mode by supplying the clock signal to the random number generator circuit without activating the initialization signal, and to cause the annealing calculation circuit to restart the annealing process together with the restarting of operation of the random number generator circuit.

2. The optimization apparatus as claimed in claim 1, wherein at a time the annealing calculation circuit suspends the annealing process, the random number generator circuit suspends operation, and retains internal states existing at a time of suspension, and, at a time the annealing calculation circuit restarts the annealing process, the random number generator circuit restarts operating from the internal states existing at the time of suspension, without performing the initialization.

3. The optimization apparatus as claimed in claim 1, wherein random numbers generated by the random number generator circuit and random numbers utilized by the annealing calculation circuit are in one-to-one correspondence to each other, without an excess or a deficit, both before and after the annealing calculation circuit suspends and restarts the annealing process.

4. The optimization apparatus as claimed in claim 1, wherein the random number generator circuit is a linear feedback shift register, and the initialization is a process of setting a seed value in the linear feedback shift register.

5. The optimization apparatus as claimed in claim 1, wherein the random number generator circuit is a Mersenne twister, and the initialization includes a process of setting initial values, successively calculated based on a seed value, to words in a memory.

6. A method of controlling an optimization apparatus, which includes a random number generator circuit to operate in synchronization with a clock signal, either in a first operation mode in which to generate a random number sequence after performing an initialization or in a second operation mode in which to generate a random number sequence without performing the initialization, the random number generator circuit being initialized by an initialization signal, the method comprising:

causing the random number generator circuit to start operating in the first operation mode by activating the initialization signal to initialize the random number generator circuit and by supplying the clock signal to the random number generator circuit after deactivating the initialization signal, and executing an annealing process in synchronization with random number generation by the random number generator;

suspending the annealing process upon completing an execution of a predetermined number of iterations;

stopping the clock signal to cause the random number generator circuit to stop operating together with a suspension of the annealing process upon completing the execution of the predetermined number of iterations; and causing the random number generator circuit to restart operating in the second operation mode by supplying the clock signal to the random number generator circuit without activating the initialization signal, and restarting the annealing process together with the restarting of operation of the random number generator circuit.

* * * * *